Inventor
MARCEL WALLACE
By Heyman Hurvitz
Attorney

Inventor
MARCEL WALLACE
By Hyman Hurvitz
Attorney

Patented Apr. 7, 1953

2,634,411

UNITED STATES PATENT OFFICE 2,634,411

NAVIGATIONAL SYSTEM

Marcel Wallace, Fairfield County, Conn., assignor, by mesne assignments, of one-half to said Wallace, doing business as Panoramic Laboratories, East Port Chester, Conn.

Application January 9, 1947, Serial No. 721,140

28 Claims. (Cl. 343—6.8)

This invention relates generally to navigational systems and methods and more particularly to systems and methods for obtaining simultaneously and in conjoint relation a plurality of simultaneous navigational parameters of one or more remote objects.

It is a primary object of the present invention to provide novel systems and methods for obtaining and displaying navigational information relating to remote objects.

It is a further object of the invention to provide a novel system and method for indicating or displaying the values of a plurality of navigational parameters associated with each of a plurality of remote objects, the value of each specific parameter being distinguishably presented.

It is another object of the invention to provide a system and method of presenting values of a plurality of parameters simultaneously, the presentation of each parameter being distinguishable in terms of a distinctive coloration associated with parameter.

It is still another object of the invention to provide a system and method of displaying simultaneously on a single screen values of altitude and azimuthal direction of each of a plurality of aircraft.

It is a further object of the invention to provide a system and method of displaying simultaneously on a single screen the values of altitude of a plurality of aircraft and the values of the azimuthal directivity of said aircraft, the values of altitude being presented in one color and the values of azimuthal directivity being presented in another color.

It is still another object of the invention to provide a radar transponder, which shall be responsive to signals on a single predetermined frequency and which shall repeat signals at a different and variable frequency the specific value of which possesses significance of a navigational character.

It is a further object of the invention to provide a novel radar receiver having provision for interpreting and indicating the time of reception of received pulses, and also the frequency of said pulses, both the said time of reception and the said frequency having different, but associated telemetric significance.

The above and still further objects and advantages of the invention will become apparent upon consideration of the following detailed description of various specific embodiments thereof, especially when taken in conjunction with the accompanying drawings, wherein.

In general, the present invention includes, in its preferred mode of employment, a ground station having an indicating or information presentation system which comprises a pair of cathode ray tubes, one of which provides on its screen a presentation in rectangular or polar coordinates of altitude against azimuthal direction and the other of which presents on its screen a presentation in like coordinates of range against azimuthal direction. The cathode ray tubes utilized are of the projection type and present their projected images on a common viewing screen in superposed relation, and the images from each of the tubes are passed through a distinctive color filter in order to provide altitude-azimuth and range-azimuth indications in respectively different and readily distinguishable colors on the viewing screen.

Range of each aircraft is measured by determining the time required for a pulsed carrier to travel from the ground station to the aircraft and return, in accordance with generically known cathode ray tube radar techniques, and by continuously rotating the radar antenna while translating the cathode ray beam in synchronism with the motion of the antenna, in one coordinate of a coordinate system, the other coordinate of which is utilized for indications of range, a plot is created on the face of cathode ray tube of range against azimuth for each airircraft in the vicinity of the ground station.

An altitude versus azimuth presentation is provided by rotating in azimuth a directional receiving antenna having a relatively narrow radiation pattern. Each object, the altitude of which is to be measured, carries a transmitter which is automatically tuned to a frequency which is representative of the altitude of the object. At the ground station the beam of a cathode ray tube is translated in one coordinate of a coordinate system in accordance with the azimuthal orientation of the receiving antenna, and in another coordinate in accordance with the frequency of each intercepted altitude tuned transmitter, whereby to provide a plot of azimuth versus altitude, for all objects in the vicinity of the ground station which are equipped with suitable transmitters.

The plots of azimuth versus altitude, and of azimuth versus range, are arranged to have equal azimuthal calibration, and the plots are projected through different color filters on a single viewing screen in superposed relation, each aircraft being then represented by a pair of dots, both having a position in a first coordinate which corresponds with azimuth of the aircraft, and one of the dots, in one color, having a position in a second coordinate representative of altitude, and in another color, in the second coordinate, representative of range.

Figure 1:
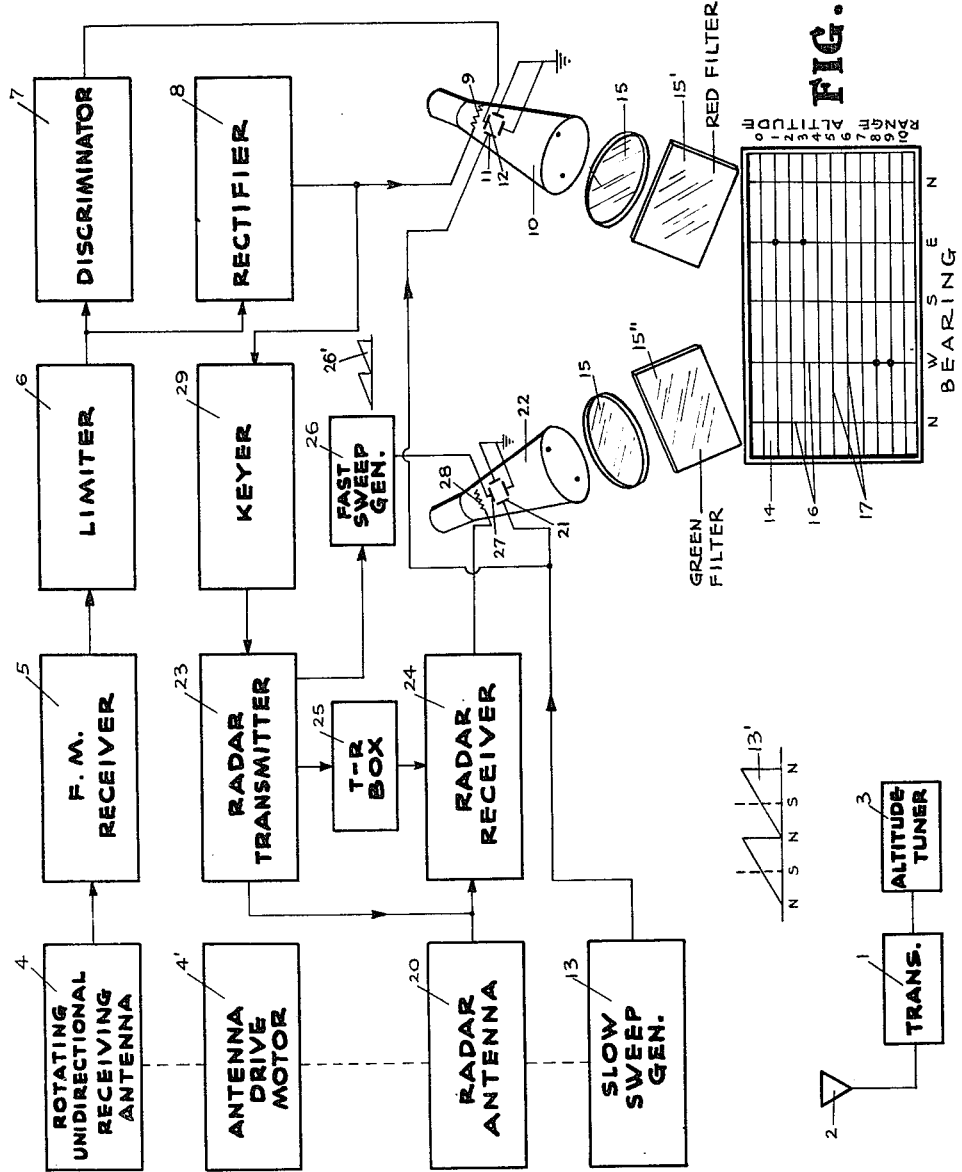
Figure 1 is a functional block diagram of an embodiment of the invention which utilizes a transmitter aboard each of a plurality of aircraft, the altitudes and ranges of which are to be remotely indicated, each transmitter being maintained tuned to a frequency bearing a predetermined relation to the altitude of its associated aircraft.

Referring now specifically to the drawings, and particularly to Figure 1 thereof, the reference numeral 1 denotes a transmitter of radio frequency energy, which may be either of the pulsed or of the continuous wave type, and which is provided with an antenna 2 and a tuner 3, the latter maintaining the output of the transmitter tuned to a frequency in a predetermined spectrum, which bears a predetermined relation to the altitude of the transmitter. The ransmitter 1 and its associated antenna 2 and altitude controlled tuner 3 may be mounted in an aircraft, or other elevated object. Any desired number of similarly equipped aircraft may be involved in the operation of the system of the invention.

A ground station is provided for indicating in the form of a unitary presentation a plot of altitudes and ranges of all aircraft utilizing the present system, the said ground station including a rotatable unidirectional receiving antenna 4, which is rotated continuously in the same sense or which is caused to oscillate continuously between two fixed values of azimuthal angle, as desired, by means of a drive motor 4' and in accordance with well known practice in the radar art. The antenna 4 may, accordingly, be considered to scan continuously a predetermined azimuthal angle of 360° or less, and being tuned to receive the band of frequencies allocated to altitude corresponding transmissions from the transmitters 1, receives signals from all altitude tuned transmitters adjacent to its location. Should the transmissions from the transmitters 1 be pulsed, the output signals derivable from the antenna 4 will be likewise pulsed. Should the transmissions from the transmitters 1 be of continuous wave character, the output signals derivable from the antenna 1 will nevertheless be of interrupted character since signals from any one transmitter 1 will be received only while the aircraft bearing that transmitter falls within the narrow radiation pattern of the rotating antenna 4.

Signals derivable from the antenna 4 are applied to a receiver section 5, which is adapted to translate signals over the entire frequency spectrum allocated to altitude representative signals, and which is for that reason identified as a frequency modulated receiver. The actual circuits utilized in the receiver 5 form no part of the invention, but conventionally would comprise the usual R. F. channel, mixer and local oscillator and I. F. channel of the well known superheterodyne system of radio reception. The output of the receiver 5 at any single instant, consisting of an I. F. carrier having a frequency bearing a definite relation to or correspondence with the altitude of an aircraft, is applied to a limiter 6, in accordance with the usual practice in receiving F. M. signals. The output of the limiter 6 consists then of a series of pulses or interrupted signals of fixed ampltiude, having frequencies corresponding with altitudes of aircraft transmitters 1, and durations dependent upon the pulse duration of transmitted pulses, if the transmissions from transmitters 1 are pulsed, and dependent upon the width of the radiation pattern and the angular velocity of antenna 4 if the transmissions from transmitters 1 are of continuous wave character.

The output of limiter 6 is applied in parallel to a discriminator or frequency detector 7 and to a rectifier or amplitude detector 8, the output of the discriminator 7 being a direct current signal having a magnitude which bears a definite relation to the frequency applied at its input, and therefore a definite relation to the altitude of a signal originating aircraft. The output of the rectifier 8 is arranged to be a positive D. C. signal of constant value in the presence of signals and zero in the absence of such signals. The output of the rectifier 8 is applied to the intensity grid 9 of a cathode ray tube 10, and serves to intensify the beam of the tube, in response to signals, sufficiently to cause a visible indication on the face of the tube, the grid 9 being biased back sufficiently to prevent visible indications in the absence of received signals. The output of the discriminator 7 is applied to the vertical deflecting plate 11 of the cathode ray tube 10, causing a vertical deflection of the cathode ray beam which is proportional to the altitude of that aircraft from which altitude corresponding transmissions are being transiently received. To the horizontal plates 12 of the cathode ray tube 10 is applied a sweep voltage which increases linearly, or in accordance with any other convenient or desirable law, with angular motion of antenna 4, from some arbitrarily predetermined zero of azimuth, such as due North. While the sweep voltage referred to may be derived in various ways, I have chosen, for the sake of simplicity, to derive sweep voltage from a sweep generator 13, which is mechanically driven from the antenna drive motor 4', and which produces an output varying linearly in a positive sense from zero voltage at due North, as illustrated at 13'.

There will be provided, by virtue of the operation of the apparatus described heretofore, a plot on the face of the cathode ray tube 10, consisting of a series of dots, each of which bears a lateral deflection from an arbitrary zero line which corresponds with the azimuth of an aircraft, and which bears a vertical deflection from an arbitrary zero corresponding with the altitude of that craft. The tube 10 is, in the present invention, a projection tube having high persistence, and is caused to project images created on the face thereof to a viewing screen 14, through a suitable lens system 15, and also through a color filter 15', which we may assume passes only red light. The screen 14 may be fabricated of ground glass, or the like and may be provided with calibration lines 16, identified with azimuth, and lines 17, identified with altitude and range values.

In order to provide a plot of range against azimuth a radar antenna 20 is provided, which may be driven by the drive motor 4'. Since the azimuthal position of the antenna 20 corresponds with that of the antenna 4 the output amplitude of the sweep generator 13 is suitable for application to the horizontal plates 21 of a cathode ray tube 22, producing a horizontal position of the cathode ray beam of the tube 22 which at all times corresponds with the azimuthal orientation of the antenna 20.

The antenna 20 is utilized in accordance with the now conventional practice for transmission of signals provided by the radar or pulse transmitter 23, and for reception of signals reflected from remote objects and which impinge after reflection on the antenna 20. Connected to the antenna 20 in receiving relation is a radar receiver 24 which is protected from transmitted pulses by the so-called T-R box 25, which acts to short out the input terminals of the receiver 24 in response to each transmitted pulse and for the duration of the transmitted pulses, enabling the receiver 24 to attain full sensitivity in the period between pulses. The radar transmitter controls the action of a fast sweep generator 26, which provides a linear sweep voltage 26' in response to each transmitted pulse, the sweep voltage being adequate in rate of rise to cause, when applied to the vertical plates 27 of the cathode ray tube 22, a motion of the cathode ray beam which is adequate to enable measurement of times of travel of pulses of electromagnetic energy from the antenna 20 to adjacent aircraft and return. The output of the receiver 24 is applied to the intensity grid 28 of the tube 22 as a positive, intensifying or spot producing voltage, the grid 28 being normally biased back sufficiently to prevent formation of visible indications on the face of the tube 22.

The indications produced on the face of the tube 22, and which constitute a plot of range versus azimuth of aircraft adjacent to the ground station, are projected by the tube 22 via lens 15 and color filter 15" onto the viewing screen 14, in superposed relation to the red colored altitude versus azimuth plot, previously described, and by selection of a suitable color for the filter 15", as, for example, green, the range plot may be readily distinguished from the altitude plot indications from any specific aircraft being presented in vertical alignment.

The radar transmitter 23 may, in the system of Figure 1, be operative continuously, if desired. Since range signals are normally possible only when aircraft are available to be ranged on, and since such aircraft carry, in the present system, continuously operating transmitters 1, I have provided a keyer 29 associated with the radar transmitter 23, which operates to render the transmitter 23 operative to transmit only in response to signals derived from the rectifier 8, i. e. when altitude representative signals are being actually received. Use of this expedient has the advantage of saving transmission time, which adds to transmitter tube life, and also prevents false echoes, such as those deriving from rain squalls, clouds and the like, but such use is not essential to the operation of the system, it being quite feasible to maintain the radar transmitter in operation continuously.

Likewise, while I have disclosed a common drive motor and a common azimuthal sweep voltage geenrator associated with the radar antenna 20 and the receiving antenna 4, this is not essential to the operation of the present system. The antenna 4 and the radar antenna 20 may be driven independently of one another, if desired, providing only that the keyer 19 is dispensed with, the radar transmitter 23 permitted to operate continuously and each antenna is provided with an independent sweep voltage generator driven in synchronism therewith.

The radar equipment comprising transmitter 23 and receiver 24 may operate in the present system, by reception of signals reflected, or scattered, from adjacent aircraft. Alternatively, each aircraft in the system may be provided with a continuously operating transponder, for intensifying returned echoes, in accordance with conventional I. F. F. and beacon practice.

Figure 2:
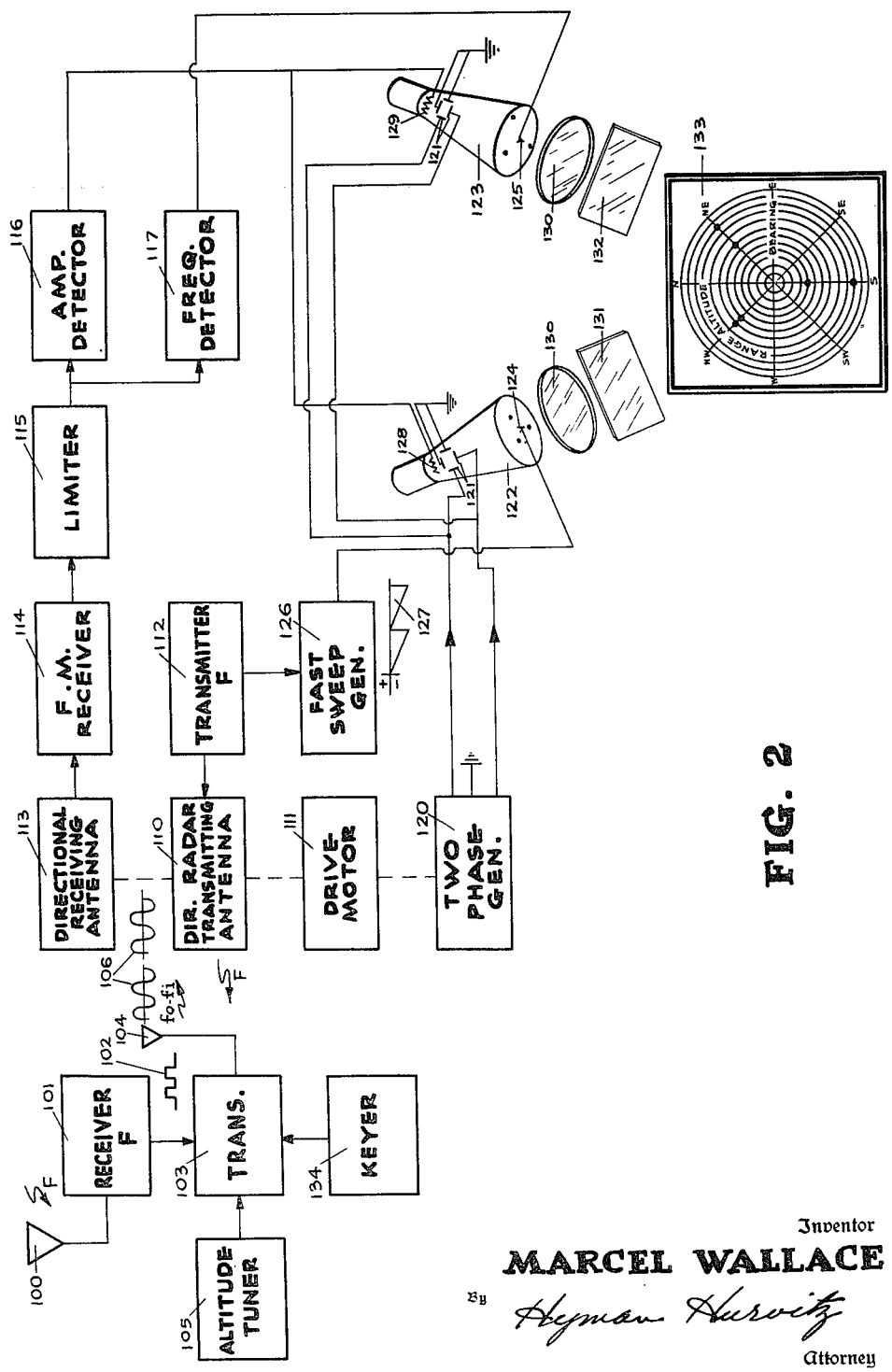
Figure 2 is a functional block diagram of a further embodiment of the invention, wherein each aircraft involved in the system of the invention carries a transponder tuned in accordance with the altitude of the aircraft.

Reference is now had to Figure 2 of the drawings, which illustrates, in functional block diagram, one of the aircraft installations, as well as a cooperating ground installation, arranged in accordance with a further embodiment of my invention.

The airborne equipment utilized in the presently described system, comprises a receiver which is tuned permanently to the carrier frequency of a radar pulse transmitter included in the ground equipment. The output signals derivable from the airborne receiver accordingly consists of a plurality of direct current pulses, occurring at the pulse repetition rate of the ground radar transmitter and at times determined by the distance of the ground station from the aircraft. Each pulse detected by the aircraft receiver is utilized to effect keying of an aircraft transmitter, which transmits on a carrier frequency which may be quite distinct from, and, in fact, unrelated to, the frequency to which the aircraft receiver is tuned.

The aircraft transmitter is tuned automatically at all times to a frequency which bears a correspondence to the altitude of the aircraft, a definite portion of the frequency spectrum being allocated for this purpose. It will be apparent then that each aircraft equipped in accordance with the present invention, and which is within receiving range of a ground station, transmits pulsed carrier signals at a carrier frequency which bears a definite relation to the altitude of the aircraft, each pulse occurring at a time which bears a definite relationship to the distance of the aircraft from the ground station. The ground station itself is equipped with a highly directional radar transmitting antenna and a cooperating highly directional pulse receiving antenna, the latter being tuned to receive signals occurring anywhere within the portion of the frequency spectrum which, as has been stated heretofore, is allocated to the system for the representation or transmission of altitude corresponding signals. The ground antennas are rotated, by means of any suitable drive mechanism, and are designed to have relatively narrow radiation patterns. By virtue of their rotation the ground antennas are caused to scan in azimuth an area surrounding the ground station, and to cause retransmission of signals from an aircraft at such times, and at such times only, as the beam of transmitted energy from the ground transmitter, in the course of its scanning action, passes through the azimuthal bearing occupied by that aircraft. Pulse signals received from an aircraft are received at the ground station by means of a receiver, which may be of the superheterodyne type, and which is equipped with a signal amplitude limiter, at the output of which is connected in parallel an amplitude detector and a frequency discriminator. These latter provide output signals in the form of direct current pulses, occurring at times and with amplitudes, respectively, bearing a definite relation to the range and altitude of the aircraft, respectively. Two cathode ray tube indicators are provided, one of which produces a plot of azimuth versus range and the other of which produces a plot of azimuth versus altitude, in response to the signals derived from the ground receiver, and the plots are superimposed on a common viewing screen, after being passed each through a different color filter, the viewing screen thus presenting a plot of azimuth versus both the ranges and the altitudes of all aircraft in the vicinity of the ground station.

Proceeding now to a more detailed description of the embodiment of the invention which is illustrated in functional block diagram in Figure 2 of the drawings, the reference numeral 100 denotes an aircraft receiving antenna, which is coupled to a pulse receiver 101, turned to receive pulse signals at a frequency F, and which provides at its output a direct current signal 102 in response to each received pulse. The output signals 102 of the receiver 101 are applied to a transmitter 103, having an antenna 104, and which is tunable by means of an altitude responsive device 105, to any frequency within the frequency band $f0$—$f1$, allocated in the present system to altitude representative transmissions. The specific character of the altitude responsive tuner 105 chosen for utilization in any practical embodiment of the present system, is not, per se, a part of the present invention and it will be understood that it is quite within the expected capability of those skilled in the art to effect tuning of the transmitter 103 in accordance with measurements accomplished by means of various types of altitude measuring equipment, such as, for example, aneroid cells and other air pressure responsive devices, or by means of electronic devices, which are capable of determining absolute altitude in terms, ultimately, of the velocity of electromagnetic energy.

The output of the transmitter 103 consists of a series of pulsed carrier transmissions 106, the frequency of each transmission being representative of the altitude of the transmitted aircraft, and the timing of each pulse being a measure of range of the aircraft with respect to the ground transmitter.

The ground station comprises a directional radar antenna 110, which is rotated by means of a suitable drive motor 111, so that the radiation pattern of the antenna 110 scans continuously in azimuth. The precise character of the antenna 110 is not of the essence of the invention, although I prefer to utilize an antenna which provides a relatively narrow beam in azimuth and a wide beam in angular elevation, so that suitable discrimination may be effected between aircraft at adjacent bearings, while enabling communication with an aircraft at a particular bearing regardless of the altitude of that aircraft.

The carrier frequency F at which the antenna 110 is energized by its associated transmitter 112, likewise involves merely a matter of choice, and that frequency may well be chosen which will render simple and economical the overall design of the transmitter 112 and the antenna 110. The length of the transmitted pulses and the time elapse between pulses may likewise be chosen purely and solely from design considerations, giving due consideration to the maximum range and the range discrimination desired to be incorporated into the system, when put to practical application, in accordance with known radar principles.

Pulses transmitted from the antenna 110 are received by receivers, such as receiver 101, mounted aboard aircraft flying in the vicinity of the ground station, such reception taking place while the aircraft is within the beam, or radiation pattern, of the antenna 110. After detection by the receivers 101, the received pulses take the form 102 and are applied to transmitters 103, and when so applied cause transmission of pulses carrier signals 106, each signal 106 corresponding in respect to its time of transmission and its duration to a received pulse.

The pulses transmitted by each transmitter, as 103, are received at the ground station on directional receiving antenna 113, which is mechanically coupled to the radar antenna 110 or to the drive motor 111, so that the antennae 110 and 113 are maintained at all times with similar azimuthal orientations, while being rotated. Signals received by the antenna 113 are applied to a receiver 114, which may be preferably, although not necessarily, of the superheterodyne type and which is capable of receiving signals over the entire band of frequencies $f0$—$f1$, converting same to a suitable intermediate frequency and amplifying the signals so converted to a level suitable for both amplitude detection and frequency discrimination.

The output signals derived from the receiver 114 are applied to a limiter 115, which has the capability of clipping all received signals to a predetermined amplitude level, in accordance with the usual practice in the reception of frequency modulated signals, for the purpose of rendering the results of a frequency measuring process independent of the amplitude of the measured signals.

The output of the limiter 115 is applied in two parallel channels, one of which includes an amplitude detector 116, and the other of which includes a frequency discriminator circuit 117. The amplitude detector is designed to provide at its output a series of positive direct current pulses of constant amplitude, in response to the series of pulsed alternating current signals applied thereto. The frequency detector or discriminator 117 produces a synchronous series of pulses, which are not, however, of constant amplitude, but rather have an amplitude determined by the carrier frequency of the pulses impinging on the antenna 113.

Driven from the drive motor 111 is a two phase generator 120, which provides suitable output for application to the deflecting plates 121 of cathode ray tubes 122 and 123, the voltages applied to one set of opposing plates of each of tubes 122 and 123 being 90° out of phase with respect to the voltage applied to the other set of opposing plates of the same tube so that the cathode ray beams of the tubes 122 and 123 are caused to travel circular paths in exact synchronism. Since the voltages generated by the two phase generator 120 are synchronized with the movements of the antennas 110 and 113 as they scan in azimuth, by virtue of the common drive motor utilized by the antennas and by the generator 120, it will be clear that the cathode ray tubes 122 and 123 will be synchronized not only with each other, but also with the antennae 110 and 113 and will assume an angular position at every instant which is representative of the angular position or bearing of the two antennas 110 and 113.

While I have disclosed a system wherein circular deflection of the beams of cathode ray indicators is produced electrostatically, it is quite feasible to accomplish the same result electromagnetically, and it is therefore within the intended scope of the present invention to produce circular beam deflection by electromagnetic means, if desired.

The radius of the circle traced out by the cathode ray beams of the tubes 122 and 123 is dependent upon the voltage applied to radial deflection electrodes 124 and 125, incorporated in the tubes 122 and 123, respectively. The electrodes 124 and 125 function in the tubes 122 and 123 in accordance with well known theory and in a manner well known, per se, and tubes incorporating such anodes are available on the open market, rendering a full explanation of the mode and theory of operation of the tubes, and of the radial deflection electrodes therein, superfluous. Suffice it to observe that the electrodes 124 and 125 serve to enlarge the radius of travel of the cathode ray beams associated with the tubes 122 and 123 when maintained at a negative potential, by reason of the repulsion between the beam and the negatively polarized electrodes 124 and 125, and that the radius of travel referred to may be narrowed by reduction of the negative voltage applied to the electrodes 124 and 125, in which case, the electrodes 124 and 125 tend to increase the beam radius of travel normally due to the deflecting plates 121 alone.

Alternatively, the electrodes 124 and 125 may be maintained at a sufficiently positive potential to overcome substantially the deflecting voltages provided by the deflecting electrodes 121, in which case the normal radius of beam travel may be maintained quite small, in the absence of opposing voltages. Signal voltages may be of such sign as to overcome or detract from the normal positive voltage of the electrodes 124 and 125, whereby any increase of signal in a negative direction causes increase of the radial distance of the cathode ray beam.

While the present invention may be envisaged as operating in either of the modes above described, as well as in an intermediate mode wherein increase or decrease of the radial position of the beam may be accomplished, according as the signal potential applied to the electrodes 124, 125 are positive or negative, I prefer, in the present embodiment of my invention, to bias the electrodes 124, 125, positively, applying negative signal or sweep voltage thereto to increase the radial position of the beam in response to such voltage.

The pulse transmitter 112 provides triggering pulses to a fast sweep saw-tooth generator 126, the output of the generator having the negatively sloping amplitude-time characteristic, illustrated at 127, for application to the deflection electrode 124 of the cathode ray tube 122. Thereby the cathode ray beam of the tube 122 is caused to sweep radially from the center of the screen of the tube, outwardly, in response to each transmitted pulse, and the rate of sweep is so adjusted and selected, with respect to the velocity of propagation of electromagnetic energy, as to allow complete radial coverage of the screen during a period equal to twice the time required for a pulse of energy to travel from the ground station to the position of desired maximum range of the equipment. The beam of the tube 122 is normally biased back in intensity, by means of a suitable permanent voltage aplied to the intensity grid 128 of the tube 122, to a value insufficient to provide a visible indication on the face of the tube, the amplitude detector 116 providing positive output pulses of sufficient intensity to cause a visible indication to appear for the duration of said output pulses. Since the output pulses derivable from the amplitude detector 116 are generated in response to signals initially provided by the transmitter 112 and which are returned to the receiver 114 by means of remote transponding equipment, including airborne receivers 101 and transmitters 103, it will be clear that the output signals provided by the detector 116 occur at times after the commencement of the build-up of the sweep voltages 127 which bear a correspondence to the distance of the transponders from the ground station. Accordingly intensification of the beam of the tube 122 takes place for radial distances corresponding with the actual distances of transponding aircraft, and at angular positions corresponding with the azimuthal bearings of such aircraft with respect to the ground station, and a plot is developed on the face of the tube 122 of the positions of all aircraft adjacent to the ground station, in terms of their bearings and ranges.

The deflection electrode 125 of the tube 123 is subjected normally, i. e. in the absence of signals, to a positive potential which is sufficient to maintain the cathode ray beam of the tube 123 adjacent to a centralized position. The output of the frequency discriminator 117 is derived in a negative sense, and serves to produce an outwardly directed radial deflection of the cathode ray beam of the tube 123, which bears a definite correspondence to the amplitude of any signal derivable from the discriminator 117, and which in turn bears a definite correspondence to the frequency of signals impressed on the input terminals of the discriminator 117. The discriminator 117 is designed, adjusted and arranged to have a linear output voltage-frequency characteristic such that for a frequency $f_0$ incoming to the receiver 114, and representative of zero altitude, an inappreciable output voltage is provided by the detector 117, and so that, in response to a frequency $f_1$, representative of the maximum altitude for which the system may be designed, a negative direct current voltage is applied to the electrode 125 from the discriminator 117, which is sufficient to cause the maximum practical radial deviation of the beam of the tube 123. Since the beam is constrained to assume an angular position corresponding with the azimuthal bearing of antennas 110 and 113, and a radial position corresponding with altitude of transponding aircraft, and since further, the intensity grid 129 of tube 123 is normally maintained biased to cut-off and permits production of a visible indication only upon receipt by the ground station of a transponded pulse, the face of the tube 123 provides a plot of azimuth versus altitude of all aircraft in the vicinity of the ground station.

Since identical voltages are applied to the deflecting electrodes 121 of the tubes 122 and 123 the angular positions of the beams in the cathode ray tubes 122 and 123 are at all times identical. The radial deflections, on the other hand, are independent of each other, and represent different physical quantities, related only in that they have a common origin, and consequently a common azimuthal bearing.

In order to provide for simple and easily correlated interpretations of the significance of the presentations provided by the cathode ray indicator tubes 122 and 123, they are selected to be of the projection type, and are arranged to project images or plots developed thereby via suitable focusing lenses 130, and each via differently colored light filters, indicated at 131 and 132, to a ground glass viewing screen 133, or the like.

The images derived from the tubes 122 and 123 are superposed on the screen 133, with corresponding angular coordinates in alignment, and for each indicated aircraft in a given azimuthal bearing, two illuminated co-radial spots appear on the screen 133, one, in one color, indicating range of the aircraft and the other, in another and readily distinguishable color, indicating altitude of the aircraft.

If desired each transmitter 103 may be keyed automatically at a slow rate, in accordance with a code peculiar to the associated aircraft, and which differs for each of the aircraft. Provision of such a keyer 134 enables identification of aircraft at the ground station, by observation and interpretation of amplitude modulations of associated pairs of indications. Use of this expedient may be of particular value should a pair of aircraft temporarily appear at the same azimuthal bearing but at different ranges and/or altitudes. In such case the identificatory amplitude modulations may serve to provide a positive correlation between each altitude indication and the properly associated range indication and may prevent mental association of indications at the same angular positions but which originate, in fact, from different aircraft.

The screen 133 may, of course, be provided with calibrated markings in order to render the magnitude of indications in terms of numerical values, such as miles of range, and thousands of feet of altitude, or the like.

Figure 3:
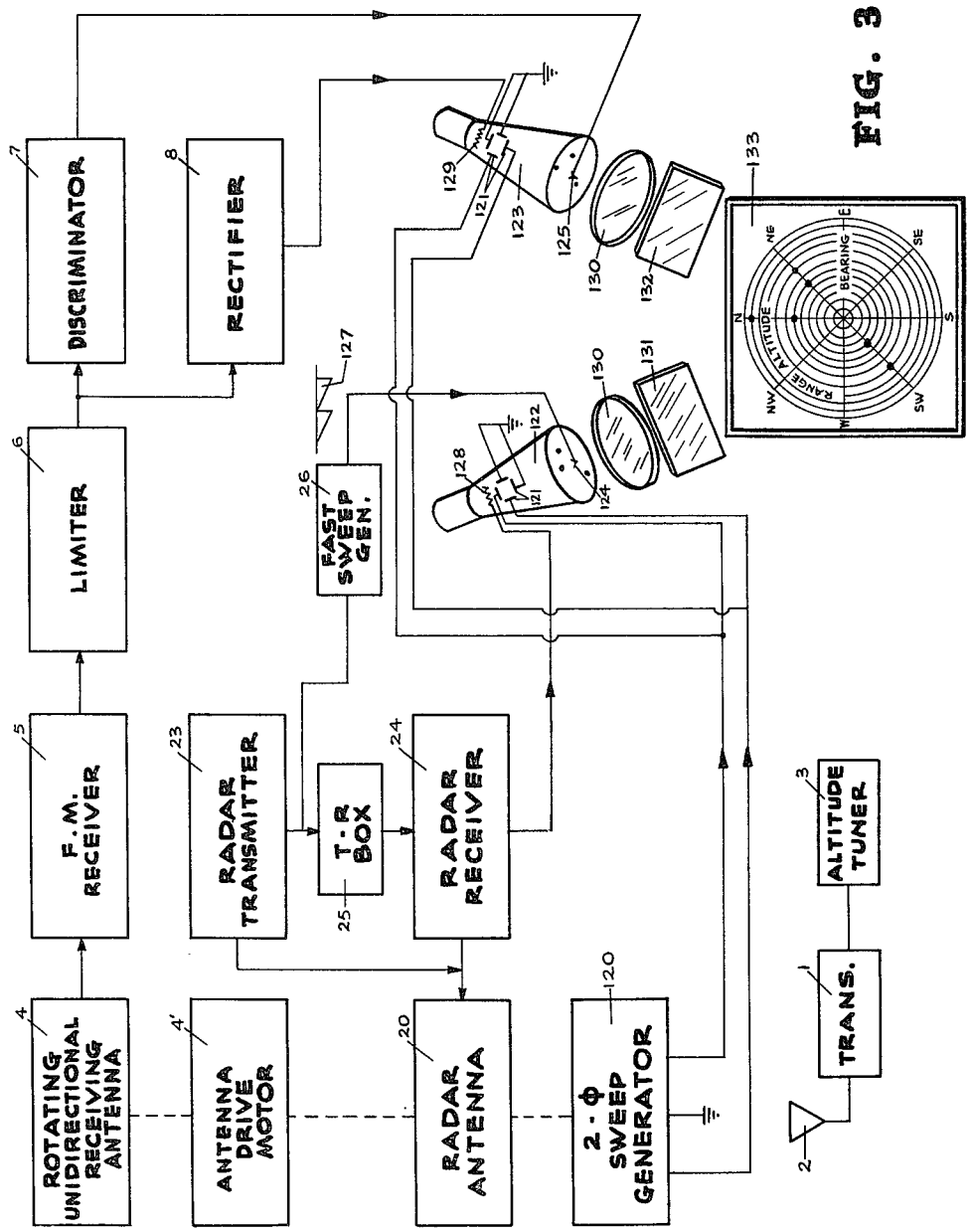
Figure 3 is a functional block diagram of a modification of the embodiment of Figure 1.

Referring now again to Figure 1 of the drawings, which illustrates an apparatus for displaying in superposed relation an altitude-bearing and a range-bearing presentation, the display being in terms of rectangular coordinates, I have conceived that a similar system to that of Figure 1 but which utilizes a display in polar coordinates as in Figure 2 of the drawings, may prove superior in some respects, for practical utility. Reference is accordingly made to Figure 3 of the drawings, which illustrates a system of the general character of that illustrated in Figure 1 of that drawing, but which has been modified, in accordance with the teaching of Figure 2 of the drawings, in such manner that a display in polar coordinates is provided.

Corresponding parts and elements in Figure 1 and Figure 3 are identified by identical numerals, and a detailed description of the construction and arrangement of the embodiment of the invention in accordance with Figure 3 is dispensed with, as superfluous in those respects in which the embodiment of Figure 3 is identical with the embodiment of Figure 1.

The airborne equipment utilized in the system of Figure 3 consists, as in Figure 1, of an antenna 2, a transmitter 1 and an altitude tuner 3, for the transmitter 1.

A radar system is provided comprising a radar antenna 20, used for both transmitting and receiving pulsed carrier transmissions, signals being provided for transmission by a radar transmitter 23, and reception being accomplished by a radar receiver 24, disabling of the receiver 24 by transmitted pulses being accomplished, in accordance with standard and well known radar techniques, by means of a T-R box 25. Signals deriving from the altitude tuned transmitter 1 are received by means of a unidirectional receiving antenna 4, which is driven or caused to scan in azimuth, together with the radar antenna 20, by means of an antenna drive motor 4'. Signals deriving from the antenna 4 are amplified, and if desired, converted to an I. F. frequency, by means of an F. M. receiver 5, the output of which is limited or clipped in a limiter 6 and thence applied to a discriminator 7 and to a rectifier 8, the former of which translates the signal supplied thereto to a D. C. voltage having an amplitude proportional to the frequency of the signal, and the latter of which produces a D. C. voltage of constant amplitude in response to incoming signals. Output of the rectifier 8 may be applied to a keyer 29, for determining intervals of operation of the radar transmitter 23, and limiting such intervals to times when targets are available. The system so far described corresponds with the embodiment of Figure 1 of the drawings.

In order to provide a polar plot of azimuth versus altitude and range, instead of the rectangular plot provided by the system of Figure 1, the antenna drive motor 4' is caused to drive a two-phase sweep generator 120, which applies its output voltages to the two pairs of electrostatic deflection electrodes 121 of each of the cathode ray indicator tubes 122 and 123 in such manner as to cause a circular motion of the beams of the cathode ray indicators.

The fast sweep generator 26 is connected to apply negative saw-tooth sweep voltages 127 to the radial deflection electrode 124 of the tube 122, the electrode 124 being normally biased positively to a sufficient extent to centralize the beam of the tube in the absence of deflection voltage. The output of the radar receiver 24 is applied to the intensity grid 128 of the tube 122, which is normally biased back sufficiently to prevent production of visual signals, this bias being overcome in response to output signals deriving from the receiver 24, so that visible indications are produced at points in the radial sweep of the beam of the tube 122 which correspond with ranges of aircraft illuminated by the action of the radar transmitter 23 and its associated antenna 20. The action of the tube 122 and of its control signals, is, accordingly, quite similar to the operation of the correspondingly numbered tube in Figure 2.

The tube designated by the numeral 123 in Figure 3 of the drawings operates in a manner corresponding with the similarly numbered tube in Figure 2 of the drawings. The radial deflection electrode 125 is normally biased positive sufficiently to centralize the beam of the tube 123, and is supplied with negative voltage from the discriminator 7 having magnitudes corresponding with the frequencies of incoming signals and consequently with the altitudes of aircraft adjacent to the ground station.

Intensifying voltage is applied to the intensity grid 129 by means of a rectifier or amplitude detector 8, at such times as signals are being received. Accordingly, visual indications are provided on the face of the tube 123 at angular positions corresponding with the azimuthal bearing of aircraft, and at radial positions corresponding with the altitudes of such aircraft, providing a polar plot of bearing versus altitude.

The presentations provided by the tubes 122 and 123 are projected via lenses 130, and via differently colored color filters 131 and 132 to a common viewing screen in superposed relation, enabling visual simultaneous observation of altitude and range of aircraft at all bearings about the ground station, as in Figure 2.

It will be obvious that while I have illustrated various specific embodiments of my invention, this is for purposes of exemplification only, the invention being susceptible to other uses than that described, and the specific embodiments being further susceptible of modification in respect to general arrangement as well as in respect to details of structure and selection of components, without departing from the true spirit and scope of the invention as defined in the appended claims.

What I claim and desire to secure by Letters Patent of the United States is:

1. In combination, a system comprising, first means comprising a first cathode ray tube for providing a first visual plot of the locations of a plurality of objects in azimuth against the ranges of said objects and over an azimuthal angle in excess of ten degrees, second means comprising a second cathode ray tube for providing a second visual plot of the locations of said objects in azimuth against the altitudes of said objects and over an azimuthal angle in excess of ten degrees, and third means for optically combining said first and second visual presentations into a single composite plot having a common coordinate in azimuth and a further coordinate representing both altitude and range.

2. A navigational system for elevated objects comprising a radar transmitter, a radar receiver, means responsive to signals provided by said radar transmitter and said radar receiver for providing a first plot of range versus azimuth of an elevated object, a transmitter borne by said elevated object for providing transmissions at a frequency determined in accordance with the elevation of said elevated object, means responsive to said transmissions from said elevated transmitter for providing a further separate plot of elevation versus azimuth of said elevated object, and means for combining said plots to provide a presentation of azimuth versus both range and elevation.

3. A system in accordance with claim 1 wherein said means for combining includes a differently colored light filter in light translating relation to each of said visual presentations for transforming said first and second visual presentations into said single composite presentation.

4. In combination, a system comprising means for providing a first visual presentation of a plot in two coordinates of the values of a first pair of physical quantities only, means for providing a second and separate visual presentation of a plot in two coordinates of the values of a second pair of physical quantities only, one of each pair of said physical quantities having identical physical significance and the remaining one of each pair of said physical quantities having different physical significance, means for optically combining said first and second visual presentations into a single presentation, wherein said third means includes a differently colored light filter in light translating relation to each of said first and second visual presentations for transforming said first and second visual presentations into said single composite presentation.

5. In combination, a radar antenna scanning in azimuth, a radar transmitter coupled thereto, a remotely located transmitter, means for tuning said remotely located transmitter in accordance with the altitude thereof, a receiving antenna scanning in azimuth and arranged for receiving signals from said remotely located transmitter, a frequency modulated receiver coupled to said receiving antenna, means for deriving signals from said receiver representative of the altitude of said remotely located transmitter, a first cathode ray indicator, means for deflecting the beam of said first cathode ray indicator in one coordinate of a coordinate system in accordance with the azimuthal bearing of said radar antenna, means for deflecting the said beam of said first cathode ray indicator in a second coordinate of said coordinate system in accordance with a range representative sweep voltage, an intensity grid for said first cathode ray indicator, means for detecting radar signals, means responsive to said last named means for applying intensifying voltage to said intensity grid, a second cathode ray indicator, means for deflecting the beam of said second cathode ray indicator in said one coordinate of said coordinate system in accordance with the azimuthal bearing of said receiving system, means for deflecting the beam of said second cathode ray indicator in said second coordinate of said coordinate system in accordance with the frequency of signals received by said frequency modulated receiver, an intensity grid for said second cathode ray indicator, and means responsive to receipt of a signal by said frequency modulated receiver for applying intensifying voltage to said intensity grid for said second cathode ray indicator.

6. A combination in accordance with claim 5 wherein said means for detecting radar signals comprises said frequency modulated receiver.

7. A combination in accordance with claim 5 and further comprising a remote receiver adapted to receive signals from said radar transmitter and associated with said remotely located transmitter, means normally disabling transmissions from said remotely located transmitter, and means responsive to reception of radar signals by said remote receiver for enabling transmissions from said remotely located transmitter, whereby said remotely located transmitter transmits carrier signals at a frequency corresponding to its altitude in response to receipt of signals at said remote receiver which are derived from said radar transmitter.

8. A combination in accordance with claim 5 wherein said cathode ray indicators are of the projection type, and wherein means are provided for projecting plots provided by said indicators on a common viewing surface.

9. A combination in accordance with claim 8 wherein said last named means comprises light filter means adapted to present the plot provided by one of said cathode ray indicators in a different color than the plot provided by the other of said cathode ray indicators.

10. A combination in accordance with claim 5 wherein said cathode ray indicators each include a radial deflection electrode for providing beam deflections in one coordinate of said coordinate system.

11. In combination, means for providing a visual plot of only the range of an elevated object against the bearing of said object in azimuth, means for providing a further and separate visual plot of only the altitude of said object against the bearing of said object in azimuth, and means for distinguishably combining said plots as a composite single visual plot of both altitude and range of said object against a common azimuth scale.

12. A navigational system for elevated objects comprising a radar pulse transmitter, a radar pulse repeater located on an elevated object, said radar pulse repeater comprising a pulse receiver and a pulse signal transmitter operative to transmit further pulse signals in response to reception of pulses from said radar pulse transmitter by said pulse receiver, means for transmitting said further pulse signals on a carrier frequency determined in accordance with the elevation of said elevated object, a pulse signal receiver for receiving said further pulse signals, and means responsive to said further pulse signals and to the carrier frequency of said further pulse signals for providing a plot of elevation and range versus azimuth of said elevated object.

13. A navigational system for elevated objects comprising a radar pulse transmitter, a radar pulse repeater located on an elevated object, said radar pulse repeater comprising a pulse receiver and a pulse signal re-transmitter operative to re-transmit pulse signal in response to reception of pulses from said radar pulse transmitter by said pulse receiver, means for re-transmitting said pulse signals on a carrier frequency determined in accordance with the elevation of said elevated object, a pulse signal receiver for receiving said re-transmitted pulse signals, means responsive to the frequency of said re-transmitted pulse signals as received by said pulse signal receiver for providing a plot of elevation versus azimuth of said elevated object, and means responsive to said pulse signals for providing a further plot of range versus azimuth of said elevated object.

14. A navigational system for elevated objects comprising a radar pulse transmitter, a radar pulse repeater located on an elevated object, said radar pulse repeater comprising a pulse receiver and a pulse signal re-transmitter operative to re-transmit pulse signals in response to reception of pulses from said radar pulse transmitter by said pulse receiver, means for re-transmitting said pulse signals on a carrier frequency determined in accordance with the elevation of said elevated object, a pulse signal receiver for receiving said re-transmitted pulse signals, said pulse signal receiver comprising a discriminator circuit for providing a voltage output determined in accordance with the carrier frequency of said pulse signals, means responsive to said voltage output for providing an indication of elevation of said remote object, and means responsive to transmission time of said pulse signals between said radar pulse transmitter and said pulse signal receiver via said radar pulse repeater for providing a measure of range of said remote object.

15. In combination, an airborne radar pulse repeater for a fixed frequency radar pulse transmitter, said airborne radar pulse repeater comprising a fixed frequency receiver adapted to receive transmissions from said radar pulse transmitter and a further pulse transmitter rendered operative to transmit further pulses in response to signals derived from said receiver, means for varying the carrier frequency of said further pulses in accordance with the altitude of said aircraft, a radar pulse receiver for receiving at least selected ones of said further pulses, and a plan position indicator responsive to at least selected ones of said further pulses for visually indicating range and bearing of aircraft.

16. In combination with a ground pulse radar equipment having a pulse transmitter and pulse receiver-indicator means for providing visual plan position indications of the ranges and bearings of a plurality of elevated objects, a radar pulse repeater located aboard each of said objects, each of said radar pulse repeaters comprising a receiver for receiving pulses from said pulse transmitter and a pulse re-transmitter for re-transmitting pulses, means for controlling said pulse re-transmitter on each of said elevated objects to re-transmit at a carrier frequency representative of the altitude of said elevated object, said pulse receiver-indicator means being arranged to receive said re-transmitted pulses and to provide a distinguishable visual display of range and bearing of elevated objects for each altitude.

17. In combination, means for generating a wave energy pulse, means for controlling the timing of said pulse with respect to a predetermined initial time in accordance with range of a movable elevated object from a predetermined geographic location, means for controlling the carrier frequency of said wave energy in accordance with altitude of said elevated object, and means for providing a visual display representing simultaneously the timing of said pulse relative to said predetermined initial time and the frequency of said wave energy.

18. In combination, means for generating a wave energy pulse, means for controlling the timing of said wave energy pulse with respect to a predetermined initial time in accordance with range of a movable object from a predetermined geographic location, means for controlling the carrier frequency of said wave energy in accordance with altitude of said object, means comprising a frequency discriminator-detector for measuring the carrier frequency of said wave energy pulse, and means responsive to said wave energy pulse and including said means comprising a frequency discriminator-detector for providing a visual display representative of the timing of said wave energy pulse relative to said predetermined initial time and of the frequency of said wave energy.

19. In combination, means at an elevated movable object for generating a wave energy pulse, means for controlling the timing of said wave energy pulse with respect to a predetermined initial time in accordance with bearing of said object with respect to a predetermined geographic location, means for controlling the carrier frequency of said wave energy pulse in accordance with altitude of said elevated movable object, and means remote from said elevated movable object for providing a visual display representing the timing of said wave energy pulse relative to said preedtermined initial time, and the carrier frequency of said wave energy pulse.

20. In combination, means at an object for generating a wave energy pulse, means for controlling the timing of said pulse with respect to a predetermined initial time in accordance with azimuthal bearing of a movable elevated object with respect to a predetermined geographic location, means for controlling the carrier frequency of said wave energy in accordance with altitude of said object, a frequency discriminator detector for measuring said carrier frequency of said wave energy, and means remote from said object and comprising said frequency discriminator detector for providing, in response to said wave energy pulse, a visual display of the timing of said wave energy pulse relative to said predetermined initial time and of said carrier frequency of said wave energy.

21. In combination, means at elevated movable object for generating a wave energy pulse, means for controlling the timing of said wave energy pulse with respect to a predetermined initial time in accordance with a value of a first measurable quantity, means for controlling the carrier frequency of said wave energy pulse in accordance with a value of a further measurable quantity, and visual display means located remotely from said object and responsive to said wave energy pulse for providing a visual display representative of said values of said first and further measurable quantities.

22. In combination, means at an object for generating a wave energy pulse, means for controlling the timing of said pulse with respect to a predetermined initial time in accordance with a value of a first measurable quantity, means for controlling frequency of said wave energy in accordance with a further measurable quantity, means remote from said object and comprising a frequency discriminator-detector for providing an output signal in response to said wave energy which is representative of said value of said further measurable quantity, and a visual display means for providing a visual display in response to said output signal representative of said values of said first and further measurable quantities.

23. The combination in accordance with claim 17 wherein said visual display is a plot of range against altitude of said object.

24. The combination in accordance with claim 18 wherein said visual display is a plot of range against altitude of said object.

25. The combination in accordance with claim 19 wherein said visual display is a plot of bearing against altitude of said object.

26. The combination in accordance with claim 20 wherein said visual display is a plot of bearing against altitude of said object.

27. The combination in accordance with claim 21 wherein said visual display is a plot in two coordinates of values of said first and further measurable quantities.

28. The combination in accordance with claim 22 wherein said visual display is a plot in two coordinates of values of said first and further measurable quantities.

MARCEL WALLACE.

REFERENCES CITED

The following references are of record in the file of this patent:

UNITED STATES PATENTS

| Number | Name | Date |
|---|---|---|
| 2,252,083 | Luck | Aug. 12, 1941 |
| 2,301,826 | Steudel et al. | Nov. 10, 1942 |
| 2,312,203 | Wallace | Feb. 23, 1943 |
| 2,392,546 | Peterson | Jan. 8, 1946 |
| 2,403,603 | Korn | July 9, 1946 |
| 2,405,231 | Newhouse | Aug. 6, 1946 |
| 2,407,644 | Benioff | Sept. 17, 1946 |
| 2,408,050 | De Rosa | Sept. 24, 1946 |
| 2,408,848 | Hammond | Oct. 8, 1946 |
| 2,416,286 | Busignies | Feb. 25, 1947 |
| 2,419,570 | Labin | Apr. 29, 1947 |
| 2,420,334 | White | May 13, 1947 |
| 2,423,023 | Hershberger | June 24, 1947 |
| 2,425,316 | Dow | Aug. 12, 1947 |
| 2,426,189 | Espenschied | Aug. 26, 1947 |
| 2,426,979 | Ayres | Sept. 9, 1947 |
| 2,427,220 | Luck | Sept. 9, 1947 |
| 2,430,292 | Hershberger | Nov. 4, 1947 |
| 2,433,341 | Busignies | Dec. 30, 1947 |
| 2,433,804 | Wolff | Dec. 30, 1947 |
| 2,434,897 | Ayres | Jan. 27, 1948 |
| 2,440,250 | Deloraine | Apr. 27, 1948 |
| 2,444,426 | Busignies | July 6, 1948 |
| 2,444,452 | Labin | July 6, 1948 |
| 2,448,016 | Busignies | Aug. 31, 1948 |
| 2,449,976 | Busignies | Sept. 28, 1948 |
| 2,453,970 | Charrier | Nov. 16, 1948 |
| 2,459,481 | Wolff | Jan. 18, 1949 |
| 2,459,482 | Bond | Jan. 18, 1949 |
| 2,344,296 | Frink | Mar. 14, 1944 |
| 2,466,804 | Giffen | Apr. 12, 1949 |
| 2,467,361 | Blewett | Apr. 12, 1949 |
| 2,468,045 | Deloraine | Apr. 26, 1949 |
| 2,468,703 | Hammond | Apr. 26, 1949 |
| 2,480,123 | Deloraine | Aug. 30, 1949 |
| 2,483,097 | McIlwain | Sept. 27, 1949 |
| 2,517,540 | Busignies | Aug. 8, 1950 |
| 2,527,547 | Hardy | Oct. 31, 1950 |
| 2,542,182 | Crump | Feb. 20, 1951 |